United States Patent [19]

Nagano

[11] Patent Number: 5,327,353
[45] Date of Patent: Jul. 5, 1994

[54] METHOD OF DETECTING STATE OF CUTTING RUBBER SHEET HAVING PARALLEL CORDS EMBEDDED THEREIN

[75] Inventor: Jun Nagano, Tokorozawa, Japan

[73] Assignee: Bridgestone Corporation, Tokyo, Japan

[21] Appl. No.: 742,806

[22] Filed: Aug. 9, 1991

[30] Foreign Application Priority Data

Aug. 21, 1990 [JP] Japan .................................. 2-219845

[51] Int. Cl.5 .............................................. B26D 1/18
[52] U.S. Cl. .................................. 364/474.09; 83/76.7; 83/72; 83/522.11
[58] Field of Search ................... 83/58, 61, 62, 62.1, 83/63, 72, 73, 74, 76.7, 522.11, 951; 364/479.09, 474.34, 474.18, 153, 154, 184, 186

[56] References Cited

U.S. PATENT DOCUMENTS

| 3,719,114 | 3/1973 | Vischulis . | |
|---|---|---|---|
| 4,070,939 | 1/1978 | Neumeister . | |
| 4,549,453 | 10/1985 | Yazaki et al. | 83/368 X |
| 4,860,620 | 8/1989 | Pizzorno . | |
| 4,920,495 | 4/1990 | Pickington | 364/474.09 X |
| 4,965,733 | 10/1990 | Kimura et al. | 364/474.09 |
| 5,029,502 | 7/1991 | Irie | 83/56 X |

FOREIGN PATENT DOCUMENTS

0125147 11/1984 European Pat. Off. .
0326280 1/1989 European Pat. Off. .

*Primary Examiner*—Jerry Smith
*Assistant Examiner*—Brian C. Oakes
*Attorney, Agent, or Firm*—Sughrue, Mion, Zinn, Macpeak & Seas

[57] ABSTRACT

A state of an operation of cutting a rubber sheet having a number of parallel cords embedded therein by moving a cutter in a cutting direction which is in parallel with a direction in which the cords extend is detected by monitoring a first displacement of the cutter in a direction of a thickness of the rubber sheet and a second displacement of the cutter in direction perpendicular to the cutting direction. When the first displacement of the cutter exceeds a predetermined threshold value, there is produced a comparison signal having a predetermined time period. In response to the comparison signal, the second displacement of the cutter is compared with a second threshold value within the time period of the comparison signal, and when the second displacement of the cutter exceeds the second threshold value, there is produced an alarm signal which represents that the cutting operation is not carried out correctly.

10 Claims, 2 Drawing Sheets

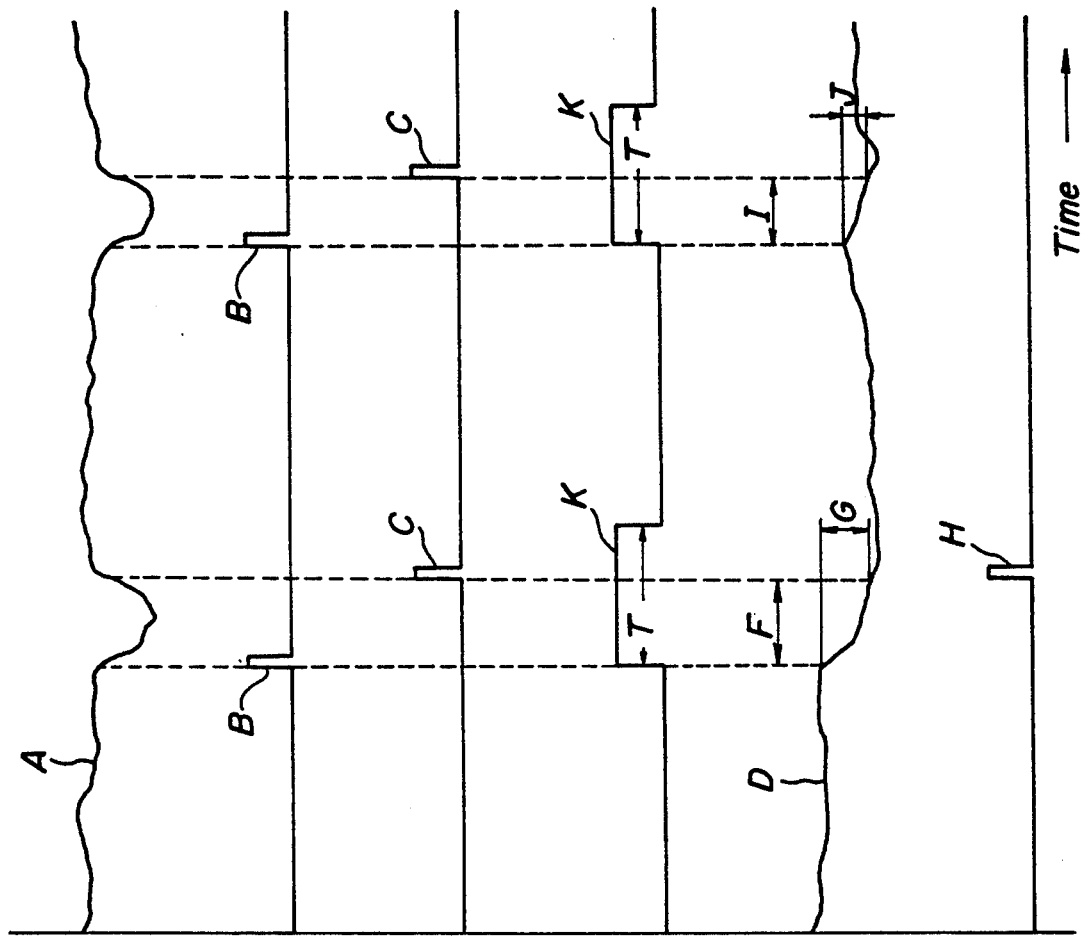

METHOD OF DETECTING STATE OF CUTTING RUBBER SHEET HAVING PARALLEL CORDS EMBEDDED THEREIN

BACKGROUND OF THE INVENTION

Field of the Invention and Related Art Statement

The present invention relates to a method of detecting or judging a state of an operation of cutting a rubber sheet having a number of parallel cords embedded therein by moving a cutter in a cutting direction parallel to a direction in which the parallel cords extend.

In case of manufacturing a tire, there is a process of cutting the above mentioned rubber sheet with cords in a direction parallel to the cords to form a belt. In Japanese Kokai Hei 1-141,730, there is described a known method of detecting a goodness or badness of the operation of cutting the rubber sheet with parallel cords. In this known method, a voltage is applied across an electrically conductive cutter and an electrically conductive plate for receiving the rubber sheet. When the cutter is brought into contact with the rubber sheet receiving plate, an electric current flows through the cutter and plate, but when the cutter is separated from the plate so that the electrical conduction between the cutter and the plate is cut-off, the current does not flow. Therefore, by detecting the current, it is possible to detect the state of the cutting operation.

In the known cutting state detecting method explained above, when the cutter rides slightly on a cord and is separated from the sheet receiving plate, is the cut-off condition produced, so that an abnormal signal is erroneously generated which indicates an inferiority of the cutting state. Further, when electrically insulating stains, injuries and so on are existent on the surface of the rubber sheet receiving plate, the current is also interrupted and the abnormal signal is erroneously generated.

SUMMARY OF THE INVENTION

The present invention has for its object to provide a novel and useful method of detecting a state of an operation of cutting a rubber sheet with a number of parallel cords, in which the slight separation of the cutter from the rubber sheet receiving plate and the surface condition of the rubber sheet receiving plate do not erroneously produce any abnormal signal.

In order to achieve the above object, according to the invention a method of detecting a state of an operation of cutting a rubber sheet having a number of cords embedded within the rubber sheet in parallel with each other by moving a cutter in a cutting direction which is parallel to the cords, comprises the steps of:
  detecting a position of the cutter with respect to the rubber sheet to derive a displacement signal;
  comparing said displacement signal with a criterion which is predetermined in relation to a diameter of a cord; and
  generating an abnormal signal when said displacement signal exceeds said criterion.

According to a first aspect of the invention, a method of detecting a state of an operation of cutting a rubber sheet having a number of parallel cords embedded therein by moving a cutter in a cutting direction which is parallel to a direction in which said cords extend comprises the steps of:
  detecting a displacement of a cutter in a direction of the thickness of the rubber sheet to generate a first displacement signal;
  comparing said first displacement signal with a first predetermined threshold value; and
  generating an abnormal signal when said first displacement signal exceeds said first predetermined threshold value.

According to a second aspect of the invention, a method of detecting a state of an operation of cutting a rubber sheet having a number of parallel cords embedded therein by moving a cutter in a cutting direction which is parallel to a direction in which said cords extend comprises the steps of:
  detecting a displacement of a cutter in a direction which is perpendicular to said cutting direction and is parallel to a plane of the rubber sheet to generate a second displacement signal; and
  comparing said second displacement signal with a second predetermined threshold value; and
  generating an abnormal signal when said second displacement signal exceeds said predetermined second threshold value.

According to a third aspect of the present invention, a method of detecting a state of an operation of cutting a rubber sheet having a number of parallel cords embedded therein by moving a cutter in a cutting direction which is parallel to a direction in which said cords extend comprises the steps of:
  detecting a displacement of said cutter in a direction of the thickness of the rubber sheet to generate a first displacement signal;
  detecting a displacement of the cutter in a direction perpendicular to the cutting direction and parallel to a plane of the rubber sheet to generate a second displacement signal;
  comparing said first displacement signal with a first predetermined threshold value to generate a comparison signal having a predetermined time period when the first displacement signal exceeds the first threshold value;
  generating a comparison signal having a predetermined time period when said first displacement signal exceeds the first threshold value;
  comparing said second displacement signal with a predetermined second threshold value in response to said comparison signal with the predetermined time period thereof; and
  generating an abnormal signal when the second displacement signal exceeds said second threshold value.

In a normal cutting operation the cutter is moved in the cutting direction which is parallel to the cords at a position between adjacent cords. When the cutter is moved across any one of the adjacent cords, portions of the rubber sheet which situate on respective sides of a cutting line are not separated from each other, but are coupled with each other by means of the cord across which the cutter has moved, so that the cutting operation must be judged to be abnormal. In this manner when the cutter is moved across a cord, the cutter is displaced in the direction of the thickness of the rubber sheet over a distance which is larger than a diameter of a cord. In the first aspect of the present invention the displacement of the cutter in this direction is always monitored and when the cutter is moved upward over the predetermined threshold value which is substantially equal to the diameter of the cord, it is judged that the state of the cutting operation is abnormal. Even when the cutter is slightly rides over a cord or travels over stains and injures formed on the surface of the rubber sheet receiving plate, there is not generated the abnormal signal, so that the cutting state can be judged precisely.

When the cutter is moved across a cord, the cutter is displaced in the direction perpendicular to the cutting direction over a distance larger than the diameter of the cord. Therefore, according to the second aspect of the invention, the displacement of the cutter in said direction perpendicular to the cutting direction is always monitored and when the cutter is displaced over a distance which exceeds the second threshold value, there is produced the abnormal signal. In this manner, the abnormal cutting state can be detected accurately.

The inventor has conducted various experiments and has found that some times the cutter moves along a top of a cord over a certain length and then the cutter is moved back into a desired position between adjacent cords. In such a case, the abnormal signal should not be generated, because the rubber sheet can be separated along the cutting line. According to the third aspect of the invention, the displacements of the cutter in the direction of the thickness of the rubber sheet as well as in the direction perpendicular to the cutting direction are always monitored and only when the displacement of the cutter in the direction of the thickness of the rubber sheet exceeds the first threshold value, the second displacement of the cutter in the direction perpendicular to the cutting direction is compared with the second threshold value for a certain time period, and when the second displacement exceeds the second threshold value, the abnormal signal is generated. In this manner, the state of the operation of cutting the rubber sheet can be detected accurately and any erroneous abnormal signal is not produced.

BRIEF DESCRIPTION OF THE DRAWINGS

FIGS. 2($a$), 2($b$), 2($c$), 2($d$), 2($e$) and 2($f$) are signal waveforms for explaining the operation of the apparatus shown in FIG. 1.

DESCRIPTION OF THE PREFERRED EMBODIMENTS

Figure 1:
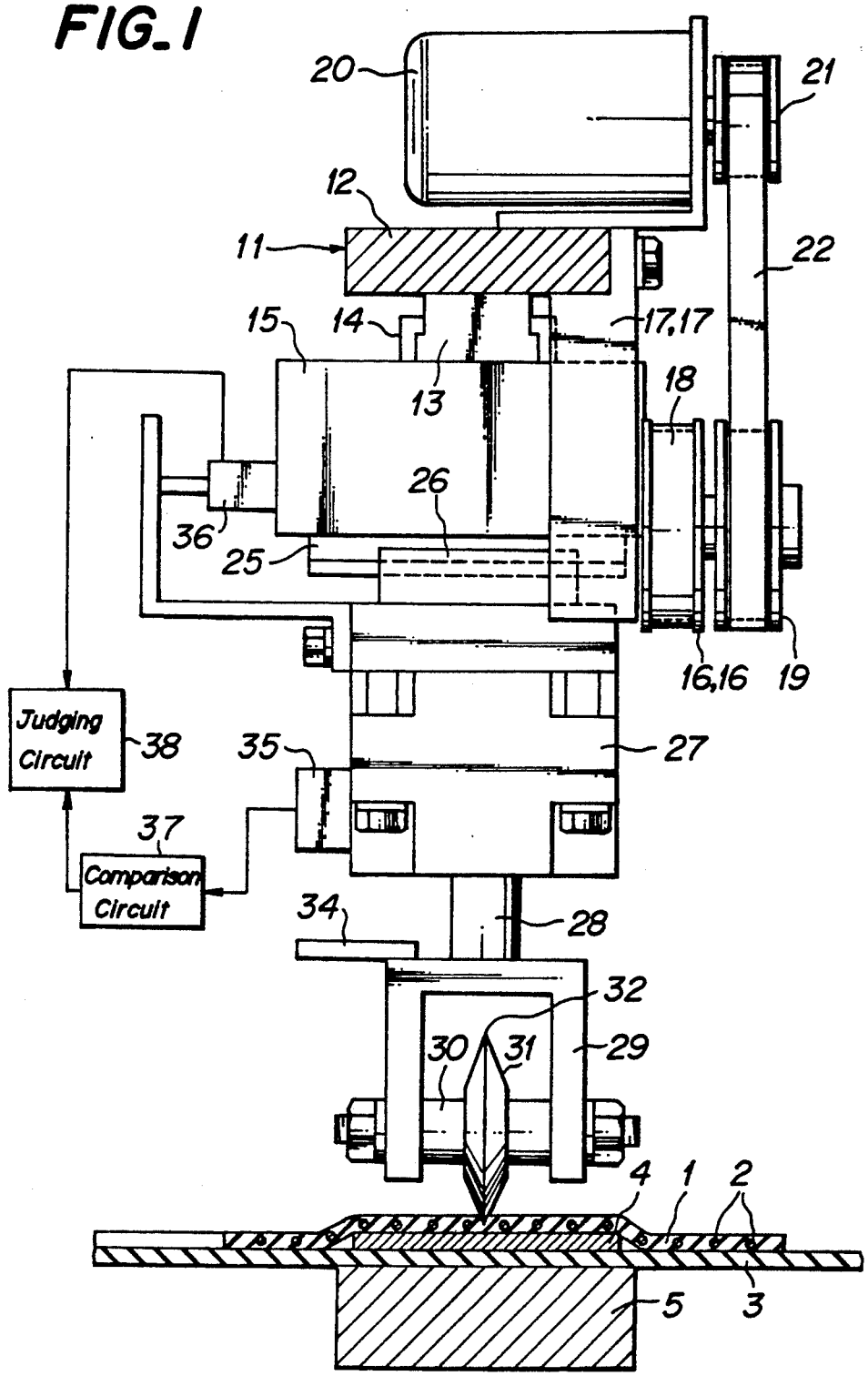
FIG. 1 is a front view showing an embodiment of an apparatus for carrying out the method according to the invention.

FIG. 1 is a front view showing an embodiment of the apparatus for carrying out the method according to the invention. A reference numeral 1 denotes a rubber sheet in which a number of steel cords 2 are embedded in parallel with each other. It should be noted that the steel cords 2 extend in a direction which is inclined with respect to an elongated direction of the rubber sheet 1. The rubber sheet 1 is fed intermittently in its longitudinal direction along a pass which is inclined by an acute angle with respect to a plane of the drawing of FIG. 1 by means of a conveyor belt 3. At a cutting station, a rubber sheet receiving plate 4 is arranged above the conveyor belt 3, so that the rubber sheet 1 is fed over the rubber sheet receiving plate 4. Under the conveyor 3 beneath the plate 4 is arranged a permanent magnet block 5 for attracting the steel cords 2 and limiting the movement of the rubber sheet 1 on the plate 4.

Above the rubber sheet receiving plate 4 is arranged a frame 11 which extends in parallel with the cords 2 and includes a horizontal supporting plate 12. To the lower surface of the horizontal supporting plate 12 is secured a guide rail 13 to which is slidably provided a travelling member 15 by means of slide bearings 14. To a side wall of the horizontal support plate 12 are secured arms 17, 17 near front and rear ends, and a pair of pulleys 16, 16 are rotatably provided on the arms 17, 17. Around these pulleys 16, 16 there is wound a first timing belt 18. In FIG. 1 only the front pulleys 16 and front arms 17 are seen. The timing belt 18 is secured to the travelling member 15. To one of the pulleys 16, 16 is secured a pulley 19 and a motor 20 is provided on the horizontal supporting plate 12 of the frame 11. A pulley 21 is connected to an output shaft of the motor 20 and a second timing belt 22 is wound around the pulleys 19 and 21. When the motor 20 is driven in a given direction, the first timing belt 18 is rotated in a given direction and thus the travelling member 15 is moved along the guide rail 13 in a cutting direction which is parallel to a direction in which the cords 2 extend.

To the lower surface of the travelling member 15 is secured a second guide rail 25 which extends in a direction perpendicular to the cutting direction. A cylinder 27 is movably supported by the second guide rail 25 by means of slide bearings 26. To a front end of a piston rod 28 of the cylinder 27 is provided a bracket 29 and a supporting shaft 30 is provided on the bracket in parallel with the second guide rail 25. To the shaft 30 is rotatably secured a ring-shaped cutter 31 having a cutting blade 32 on its periphery.

When the cylinder 27 is actuated, the piston rod 28 is moved downward such that the cutter 31 is brought into contact with the rubber sheet receiving plate 4. Under such a condition the motor 20 is energized to move the travelling member 15 in the cutting direction in which the cords 2 extend. In this manner, the rubber sheet 1 is cut along a cut line extending in the direction in which the cords 2 embedded in the rubber sheet extend. In the ideal cutting operation, the cutter blade 32 is positioned at a middle point between adjacent cords 2 as illustrated in FIG. 1.

On the cylinder 27 is provided a first position sensor 35 which is formed by an optical displacement sensor and detects a variation in a distance between the sensor and a measuring plate 34 secured to the bracket 29. That is to say, the first position sensor 35 can detect the first displacement of the cutter 31 in the direction of the thickness of the rubber sheet 1 to produce a first displacement signal. A second position sensor 36 is secured to the travelling member 15 to detect a second displacement of the cutter 31 in the direction perpendicular to the cutting direction to generate a second displacement signal. In this embodiment, the second position sensor 36 is formed by a differential transformer.

The first position sensor 35 is connected to a comparison circuit 37. In the comparison circuit 37, the first displacement signal supplied from the first position sensor 35 is passed through a differentiating filter to derive a differential in time of the first displacement signal and then the thus derived differential is compared with predetermined positive and negative threshold values. The comparison circuit 37 generates a comparison signal having a predetermined time period when the differential of the first displacement signal exceeds the positive threshold value. When the differential of the first displacement signal exceeds the second threshold value, the comparison circuit 37 produces a comparison stop signal. It should be noted that the positive and negative threshold values are determined such that they are substantially equal to values of the differentials which are obtained when the cutter 31 is moved to ride on and off a cord 2, respectively. That is to say, the first and second threshold values are determined in connection with the diameter of the cords 2. Therefore, when the cutter 31 is moved to ride on a cord 2, the differential of the first displacement signal exceeds the first threshold value and the comparison signal is produced. When the cutter is moved to ride off the cord, the differential of the first displacement signal exceeds the second threshold value and the comparison stop signal is generated.

The comparison circuit 37 is connected to a judging circuit 38 to which is also connected the second position sensor 36. When the comparison signal is supplied from the comparison circuit 37 to the judging circuit 38, the judging circuit 38 initiates to detect the variation of the second displacement signal supplied from the second position sensor 36 during the predetermined time period of the comparison signal. When the variation of the second displacement signal exceeds a third predetermined threshold value which has been previously set into the judging circuit 38, the judging circuit produces an abnormal signal. That is to say, when the cutter 31 is moved in a direction perpendicular to the cutting direction over a distance larger than the diameter of a cord 2, it is judged that the cutting operation is inferior. When the comparison stop signal is generated from the comparison circuit 37 before the end of the predetermined time period of the comparison command signal, the variation of the second displacement from the comparison start signal to the comparison stop signal is derived and the thus derived variation is compared with the third threshold value.

The abnormal signal thus generated by the judging circuit 38 is utilized to de-energize the motor 20 to stop the cutting operation. At the same time, an alarm is generated by a buzzer, CRT and so on.

Now the operation of the apparatus illustrated in FIG. 1 will be explained with reference to signal waveforms shown in FIGS. 2(a) to 2(f). In case of cutting the rubber sheet 1 along the cords 2, at first the piston rod 28 of the cylinder 27 is pushed to move the cutter 31 downward such that the blade 32 of the cutter 31 is brought into contact with the upper surface of the rubber sheet receiving plate 4. Then the motor 20 is driven to move the first timing belt 18 in the given direction, so that the travelling member 15, cylinder 27 and cutter 31 are moved in the cutting direction along which the cords 2 extend. Due to this movement, the cutter 31 s rotated and the rubber sheet 1 is cut along a cutting line situated between adjacent cords 2.

During the cutting operation, when the cutter 31 begins to ride up on one of the adjacent cords 2, the piston rod 28 is moved upward and the first displacement signal A shown in FIG. 2(a) is decreased. Then the comparison circuit 37 detects the variation of the first displacement in time by differentiating the first displacement signal A. The thus derived differential of the first displacement signal A is compared with the negative threshold value and when the differential of the first displacement signal A exceeds the negative threshold value, the comparison circuit 37 generates a comparison start signal B as shown in FIG. 2(b). This comparison start signal B represents that the first displacement signal A is decreased abruptly due to the fact that the cutter 31 rides on a cord 2.

When the cutter 31 is further moved across the cord 2, the first displacement signal A is then increased as depicted in FIG. 2(a). In the comparison circuit 37, the first displacement signal A is continuously differentiated to derive the differential of the first displacement signal, and when the differential exceeds the positive threshold value, the comparison circuit 37 generates the comparison stop signal C shown in FIG. 2(c).

When the cutter 31 moves across the cord 2, the cutter is moved in the direction of the thickness of the rubber sheet 1 as well as in the direction perpendicular to the cutting direction, i.e. in the direction in which the shaft 30 extends. The movement of the cutter 31 in the direction perpendicular to the cutting direction is always detected by the second position sensor 36 and the second displacement signal D illustrated in FIG. 2(e) is continuously supplied to the judging circuit 38. When the comparison start signal B is supplied from the comparison circuit 37 to the judging circuit 38, the judging circuit 38 generates a comparison signal K having a predetermined time period T as illustrated in FIG. 2(d). This time period T may be determined experimentally and is usually longer that a time period during which the cutter 31 is riding on a cord 2. Therefore, in almost all cases, the comparison stop signal C is produced before the end of the comparison signal K.

In the judging circuit 38, when the comparison start signal B and then the comparison stop signal C are supplied from the comparison circuit 37, a variation G of the second displacement signal D during a time interval F between the comparison start and stop signals is detected as depicted in FIG. 2(e). When the comparison stop signal C is not produced during the time period T, the judging circuit 38 operates to measure a variation of the second displacement signal D during this time interval T. Then the thus measured variation G of the second displacement signal during the time period F or T is compared with the third threshold value and when the variation G exceeds the third threshold value, the judging circuit 38 generates the abnormal signal H as shown in FIG. 2(f). The thus generated abnormal signal H is supplied to a driving circuit of the motor 20 to stop the rotation of the motor and is also supplied to the buzzer and CRT to generate the alarm.

After the cutter 31 has been moved to ride on a cord 2 and then has been returned into the initial position between adjacent cords, the first displacement signal A generated by the first position sensor 35 is once decreased, but is increased again within a relatively short time interval I. Therefore, the variation J in the second displacement signal during this short time interval I is relatively small and does not exceed the third threshold value, so that the judging circuit 38 does not produce the abnormal signal. In this manner when the cutter 31 is moved to ride on a cord 2, but does not cross the cord, the erroneous judgment is not effected and the abnormal signal is no longer generated. Therefore, it is possible to detect the state of the cutting operation very precisely and accurately.

As explained above, in the present embodiment, the real abnormal state of the cutting operation can be detected without being affected by the above mentioned movement of the cutter and stains and injuries on the surface of the rubber sheet receiving plate 4.

In the embodiment so far explained, the differential of the first displacement signal A of the cutter 31 is derived with the aid of the differentiating filter provided in the comparison circuit 37 and the thus derived differential is compared with the negative and positive threshold values to produce the comparison start and stop signals, respectively. When the surface of the rubber sheet receiving plate 4 is sufficiently flat, it is possible to omit the filter and the first displacement signal A may be compared with a single threshold value. In this case, when the first displacement signal A becomes higher than the threshold value, the comparison circuit 37 generates the comparison start signal B and when the first displacement signal becomes lower than the threshold value, the comparison circuit produces the comparison stop signal C. Also in this case, a time interval between the comparison start and stop signals becomes substantially constant.

In the above embodiment, the variation of the second displacement signal D is detected during the time interval between the comparison start and stop signals B and C or the constant time interval T of the comparison signal K when the comparison stop signal C is not generated within the time period T. According to the invention, it is also possible to supply only the comparison start signal B to the judging circuit 38 and the variation of the second displacement signal D is detected always for the constant time period T of the comparison signal K. Further it is also possible to supply only the comparison end signal C to judging circuit 38 to generate the comparison signal K having the constant time period T and the variation of the second displacement signal D is detected during this constant time period. In such a case it is necessary to store at least the second displacement signal. If the first displacement signal A is also stored, the comparison start signal B may be generated and thus the deviation of the second displacement signal D may be measured during the time interval between the comparison start and stop signals B and C.

Moreover, in the above explained embodiment, the comparison circuit 37 is provided separately from the judging circuit 38, but according to the invention, the comparison circuit 37 may be provided in the judging circuit 38. That is to say, the comparison circuit 37 and judging circuit 38 may be formed by a single signal processing circuit.

In another embodiment of the method according to the invention, there is provided the first position sensor 35 for detecting the first displacement signal A, and when the first displacement signal A is decreased smaller than a predetermined threshold value, an abnormal signal is generated.

In still another embodiment of the method according to the invention, only the movement of the cutter in the direction perpendicular to the cutting direction is detected to produce the second displacement signal D and when the second displacement signal exceeds a predetermined threshold value, an abnormal signal is generated.

As explained above in detail, in the method according to the invention, the cutting operation of the rubber sheet can be precisely detected by monitoring the movement of the cutter in the direction of the thickness of the rubber sheet and/or in the direction perpendicular to the cutting direction. Even if the cutter is moved to ride on a cord, there is not produced an abnormal signal in error not so long as the cutter has been moved across the cord. Further, the surface condition of the rubber sheet receiving plate could not affect the detection of the the state of the cutting operation.

I claim:

1. A method of detecting a state of an operation of cutting a rubber sheet having a number of cords embedded therein in parallel with each other by moving a cutter in a cutting direction which is parallel to a direction in which the cords extend, comprising the steps of:
   detecting a displacement of said cutter in a direction of the thickness of the rubber sheet to generate a first displacement signal;
   detecting a displacement of the cutter in a direction perpendicular to the cutting direction to generate a second displacement signal;
   comparing said first displacement signal with a first criterion which is predetermined in relation to a diameter of the cord;
   generating a comparison signal for a predetermined time period when said first displacement signal exceeds the first criterion;
   comparing said second displacement signal with a predetermined second threshold value within the predetermined time period of said comparison signal; and
   generating an abnormal signal when the second displacement signal exceeds said second criterion.

2. A method according to claim 1, wherein said first displacement signal is differentiated in time to derive a differential of the first displacement signal, said differential of the first displacement signal is compared with first and second threshold values having opposite polarities, a comparison start signal and a comparison stop signal are generated when the differential exceeds the first and second threshold values, respectively, and said comparison signal is generated in response to said comparison start signal.

3. A method according to claim 2, wherein said time period of the comparison signal is set to be longer than a time interval between said comparison start and stop signals, and said second displacement signal is compared with said second criterion during the time interval between said comparison start and stop signals, when the comparison stop signal is generated within said time period of the comparison signal.

4. A method according to claim 3, wherein a variation of the second displacement signal is detected during said time interval and the thus detected variation of the second displacement signal is compared with a third threshold value.

5. A method according to claim 4, wherein said third threshold value is made substantially equal to a diameter of the cords.

6. A method according to claim 1, wherein said first displacement signal is compared with a predetermined first threshold value, when the first displacement signal is decreased below the first threshold value, said comparison start signal is generated, when the first displacement signal is increased above the first threshold value, said comparison stop signal is generated, and said second displacement signal is compared with a second threshold value, whereby said first and second threshold values are made substantially equal to the diameter of the cord.

7. A method according to claim 1, wherein said first displacement signal is differentiated in time to derive a differential of the first displacement signal, this differential of the first displacement signal is compared with a first predetermined threshold value, a comparison command signal is generated when the differential of the first displacement signal exceeds said first threshold value, said comparison signal having the predetermined time period is generated in response to said comparison command signal, and said second displacement signal is compared with a second threshold value within said time period of the comparison signal.

8. A method according to claim 7, wherein said comparison command signal is generated when said differential of the first displacement signal exceeds the first threshold value having a negative polarity.

9. A method according to claim 7, wherein said comparison command signal is generated when said differential of the first displacement signal exceeds the first threshold value having a positive polarity.

10. A method according to any one of claims 8 and 9, wherein each of said first and second threshold values is made substantially equal to a diameter of the cords.

* * * * *